United States Patent
Torigoe et al.

(10) Patent No.: US 7,354,663 B2
(45) Date of Patent: Apr. 8, 2008

(54) THERMAL BARRIER COATING, MANUFACTURING METHOD THEREOF, TURBINE PART AND GAS TURBINE

(75) Inventors: Taiji Torigoe, Takasago (JP); Kazutaka Mori, Takasago (JP); Sunao Aoki, Takasago (JP); Kouji Takahashi, Takasago (JP); Minoru Ohara, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/815,734

(22) Filed: Apr. 2, 2004

(65) Prior Publication Data

US 2005/0221109 A1    Oct. 6, 2005

(51) Int. Cl.
  *B32B 9/00* (2006.01)
(52) U.S. Cl. .............. 428/701; 428/633; 428/697; 428/699; 428/702; 416/241 B
(58) Field of Classification Search ........... 428/683, 428/632, 701, 702, 697, 699, 312.2, 304.4; 427/585, 421, 453; 416/241 B
See application file for complete search history.

(56) References Cited

U.S. PATENT DOCUMENTS 6,025,078 A * 2/2000 Rickerby et al. .......... 428/469
6,858,334 B1 * 2/2005 Gorman et al. ........... 428/701
2003/0138641 A1 * 7/2003 Fukudome et al. ........ 428/446
2003/0211354 A1 * 11/2003 Subramanian et al. ..... 428/633
2005/0170200 A1 * 8/2005 Nagaraj et al. ........... 428/633

FOREIGN PATENT DOCUMENTS

| JP | 60-190580 | 9/1985 |
|---|---|---|
| JP | 61-41757 | 2/1986 |
| JP | 6-235074 | 8/1994 |
| JP | 2710075 | 10/1997 |
| JP | 9-327779 | 12/1997 |
| JP | 10-25578 | 1/1998 |
| JP | 10-154596 | 6/1998 |
| JP | 2000-144365 | 5/2000 |
| JP | 2000-301655 | 10/2000 |
| JP | 2001-240983 | 9/2001 |

* cited by examiner

*Primary Examiner*—John J. Zimmerman
*Assistant Examiner*—Timothy M. Speer
(74) *Attorney, Agent, or Firm*—Wenderoth, Lind & Ponack, L.L.P.

(57) ABSTRACT

A thermal barrier coating enabling to prevent peeling of layer in a high temperature use and still having a high thermal barrier effect, a turbine part coated by this thermal barrier coating and a gas turbine comprising this turbine part are provided. The thermal barrier coating comprises a base material 21 of high temperature heat resistant alloy and a ceramics layer 23 formed on the base material 21. The ceramics layer 23 comprises $ZrO_2$ added with $Yb_2O_3$ as stabilizer and is laminated on the base material via a bond coat layer 22 laminated as a metallic bond layer. A plurality of cracks 23A are preferably introduced in the ceramics layer 23. The turbine part is constructed having its surface coated with the above thermal barrier coating.

14 Claims, 7 Drawing Sheets

THERMAL BARRIER COATING, MANUFACTURING METHOD THEREOF, TURBINE PART AND GAS TURBINE

BACKGROUND OF THE INVENTION

1. Field of the Invention

The present invention generally relates to a thermal barrier coating that is excellent in the durability and a manufacturing method thereof and specifically relates to a construction of a ceramics layer used as a top coat of the thermal barrier coating. The present invention also relates to a turbine part using this thermal barrier coating and a gas turbine using this turbine part.

2. Description of the Prior Art

Recently, enhancement of the thermal efficiency of thermal power generation is being studied as one of energy saving measure. For enhancing the efficiency of a power generation gas turbine, elevating the gas inlet temperature is effective, and the temperature thereof sometimes becomes as high as about 1500° C. In order to realize such a high temperature of a power generation plant, it is necessary to use heat resistant parts and components in constructing stationary blades, moving blades, combustor walls, etc. constituting the gas turbine. While the turbine blades are made of heat resistant metals, they can still hardly resist such a high temperature. Hence, in order to ensure protection from the high temperature, to form a thermal barrier coating or TBC is currently being carried out such that a ceramics layer of oxide ceramics is formed on a base material of heat resistant metal via a metallic bond layer by a coating process of thermal spraying, etc. As the ceramics layer, a material of $ZrO_2$ group, specifically YSZ (yttria stabilized zirconia), which is $ZrO_2$ partially or completely stabilized by $Y_2O_3$, is often used, as it has a relatively low thermal conductivity and relatively high thermal expansion coefficient in the ceramics materials.

Even in the case where the gas turbine moving blades or stationary blades are coated with the thermal barrier coating having the ceramics layer of the above-mentioned YSZ, however, it is considered that the gas turbine inlet temperature is elevated to a temperature exceeding 1500° C. according to the kind of gas turbine. If operation is at such a high temperature, there is a risk that a portion of the ceramics layer peels off during the gas turbine operation under severe operating conditions, damaging the heat resisting ability.

Also, from the viewpoint of recent environmental protection measures, development of a closed type gas turbine that is able to correspond to a recovery of carbon dioxide is being carried out. In this type of gas turbine, the turbine inlet temperature is considered to become as high as 1700° C. and a surface temperature of the turbine blade is presumed to become as high as 1300° C. Thus, a higher heat resisting ability is being desired for the thermal barrier coating of the turbine blade.

SUMMARY OF THE INVENTION

In view of the above-mentioned circumstances of the prior art, it is an object of the present invention to provide a thermal barrier coating that hardly peels off even when it is used at a high temperature and still has a high thermal barrier effect, as well as to provide a manufacturing method of this thermal barrier coating.

Also, it is an object of the present invention to provide a turbine part coated with the above-mentioned thermal barrier coating as well as to provide a gas turbine using this turbine part.

The above-mentioned problem of peeling of the ceramics layer comprising YSZ is caused by the fact that the crystalline stability of YSZ is not sufficient in the high temperature environment and also is not sufficient in durability against a large thermal stress. Hence, in order to achieve the above-mentioned objects, the inventors here have carried out extensive studies on the construction of the thermal barrier coating for enhancing the crystalline stability and thermal cycle durability at the high temperature of the ceramics layer of the thermal barrier coating, and have obtained expertise to complete the present invention such that the durability of the thermal barrier coating can be enhanced by constructing the ceramics layer with $ZrO_2$ stabilized by $Yb_2O_3$ or $ZrO_2$ stabilized by $Yb_2O_3$ and $Er_2O_3$.

That is, according to the present invention, a thermal barrier coating comprises a base material of a high temperature heat resistant alloy and a ceramics layer formed on the base material for enhancing heat resistance of the base material, wherein the ceramics layer comprises $ZrO_2$ added with $Yb_2O_3$ as a stabilizer. According to the thermal barrier coating so constructed, a crystalline stability excellent in a high temperature as compared with the conventional ceramics layer comprising YSZ can be obtained and thereby an excellent thermal cycle durability can be obtained.

In the thermal barrier coating mentioned above, the stabilizer may further include $Er_2O_3$.

In the prior art thermal barrier coating comprising YSZ, if it is used for a high temperature part of a turbine part, etc. so as to be exposed to a high temperature for a long time, there is a problem in that a phase metamorphosis arises in the interior of YSZ to thereby deteriorate the thermal barrier characteristic or that a volumetric change due to the phase metamorphosis causes stress in the ceramics layer to thereby generate cracks. This is explained such that, while the YSZ layer formed on a surface of a turbine part, etc. by a thermal spraying process is of a semi-stabilized tetragonal crystal phase (t' phase) that is formed by rapid cooling from a fusion or semi-fusion state, if the YSZ of this t' phase is exposed to a high temperature environment for a long time, a phase metamorphosis from the semi-stabilized t' phase to t phase (tetragonal crystal phase) arises in the interior of the YSZ layer. This t phase is a high temperature phase and, if the temperature of the YSZ layer lowers by stoppage of the gas turbine, for example, this t phase changes to m phase (monoclinic crystal phase) to thereby change the volume. This change from t phase to m phase causes a large volumetric change so that a large stress acts on the YSZ layer to generate cracks therein. By the progress of the cracks, a portion of the YSZ layer peels off. This is considered the reason why the thermal barrier characteristic of the thermal barrier coating deteriorates.

On the contrary, according to the present invention, the ceramics layer comprising $ZrO_2$ added with $Yb_2O_3$ or $Yb_2O_3$ and $Er_2O_3$ as the stabilizer is excellent in crystalline stability so that the above-mentioned phase metamorphosis hardly occurs as compared with the conventional ceramics layer comprising YSZ. Hence, the thermal barrier coating according to the present invention can realize an excellent thermal cycle durability.

In the thermal barrier coating of the present invention, it is preferable that a $Yb_2O_3$ addition quantity in the ceramics layer is 8 weight % or more and 27 weight % or less.

In the thermal barrier coating of the present invention, it is more preferable that the $Yb_2O_3$ addition quantity in the ceramics layer is 10 weight % or more and 25 weight % or less.

In the thermal barrier coating of the present invention, it is most preferable that the $Yb_2O_3$ addition quantity in the ceramics layer is 15 weight % or more and 20 weight % or less.

In the ceramics layer comprising $ZrO_2$ added with $Yb_2O_3$ as the stabilizer, the $Yb_2O_3$ addition quantity is controlled within the above-mentioned ranges and thereby a thermal barrier coating further excellent in crystalline stability and thermal cycle durability can be obtained. It is to be noted that the inventors here have experimentally verified the appropriateness of the above-mentioned ranges of the $Yb_2O_3$ addition quantity and the details thereof will be described later in the item "Actual Examples".

In the thermal barrier coating of the present invention having the ceramics layer in which the stabilizer of $Yb_2O_3$ and $Er_2O_3$ is added, it is preferable that the $Yb_2O_3$ addition quantity in the ceramics layer is 0.1 weight % or more and 25 weight % or less and the $Er_2O_3$ addition quantity in the ceramics layer is 0.1 weight % or more and 25 weight % or less and a total of the $Yb_2O_3$ addition quantity and the $Er_2O_3$ addition quantity is 10 weight % or more and 30 weight % or less.

In the ceramics layer comprising $ZrO_2$ added with both $Yb_2O_3$ and $Er_2O_3$ as the stabilizer, the addition quantity of the respective components is controlled within the above-mentioned ranges and thereby a ceramics layer further excellent in anti-peeling ability can be obtained and a thermal barrier coating excellent in thermal cycle durability can be obtained.

In the thermal barrier coating of the present invention, it is preferable that the ceramics layer has fine pores formed therein and a porosity of the pores relative to the ceramics layer is 8% or more and 15% or less. That is, in the thermal barrier coating of the present invention, if an occupancy rate of the fine pores included in the ceramics layer (this is defined as porosity in the present description) is controlled within the above-mentioned range, a thermal barrier characteristic of the ceramics layer given by the pores can be enhanced and, even if a high thermal stress acts on the ceramics layer due to thermal cycles, that stress can be mitigated. Thereby, a thermal barrier coating excellent in the thermal cycle durability can be obtained.

In the thermal barrier coating of the present invention, it is preferable that the ceramics layer has cracks, elongating in a thickness direction of the ceramics layer, introduced in the ceramics layer. By intentionally introducing cracks that elongate in the ceramics layer thickness direction, stress that acts on the ceramics layer, which has a smaller thermal expansion coefficient as compared with the base material and is poor in the ductility, can be mitigated, and a ceramics layer hardly causing peeling can be obtained. More concretely, if the thermal barrier coating is heated, a dimensional change due to thermal expansion becomes larger in the base material than in the ceramics layer and stress arises acting in a direction along a face of the ceramics layer. By introducing the cracks in the ceramics layer, however, such stress acting in the ceramics layer itself can be largely mitigated by a change in the size of gaps between the cracks, so the occurrence of cracks in the direction along the ceramics layer face that may cause peeling of the ceramics layer can be effectively prevented.

Differently from the cracks caused by change of crystal phases due to thermal cycles, the cracks so intentionally introduced cause no generation of m phase in the surroundings of the cracks and hence no volumetric change is caused in the ceramics layer during the thermal cycles. Thus, little progress of the cracks is caused by temperature changes due to thermal cycles and no worry that the life of the ceramics layer is made shorter by introducing the cracks is considered.

In the thermal barrier coating of the present invention, it is preferable that the cracks in the ceramics layer elongate in the range of ±40° relative to the normal line to the face of the ceramics layer. As the cracks elongating in the direction along the face of the ceramics layer is liable to cause peeling of the ceramics layer, it is preferable that the direction in which the cracks elongate is parallel to the normal line to the face of the ceramics layer as much as possible. However, to arrange all the cracks to elongate in the direction normal to the face of the ceramics layer is actually impossible. Also, as it is verified by tests performed by the inventors here that, if the inclination of the cracks is in the range of ±40° relative to the normal line to the face of the ceramics layer, no substantial peeling of the ceramics layer is caused. Hence, the direction in which the cracks elongate is set to the range as mentioned above.

In the thermal barrier coating of the present invention, it is preferable that an interval between the cracks, adjacent to each other, is 0.05 to 1 times the thickness of the ceramics layer. That is, supposing that the thickness of the ceramics layer is 0.5 mm, the interval between the cracks is preferably in the range of 0.025 to 0.5 mm. By introducing the cracks in the ceramics layer with such interval, a thermal barrier coating having a ceramics layer excellent in anti-peeling ability can be obtained. If the above-mentioned interval is less than 0.05 times of the ceramics layer thickness, a bonding area between a columnar crystal and the base material (or the metallic bond layer to be described later) becomes smaller so that a bonding strength thereof tends to become lower and a sufficient strength may not be obtained. Also, if the interval exceeds 1 times the ceramics layer thickness, a singular stress in the direction of peeling at extreme ends of the cracks becomes very high and this may promote peeling.

In the thermal barrier coating of the present invention, it is preferable that the ceramics layer in which the cracks are introduced has a corrosive component penetration preventing layer, made of the same material as the ceramics layer, formed on the ceramics layer.

Also, in this thermal barrier coating, it is preferable that the corrosive component penetration preventing layer has a thickness of 5 to 50 μm and a porosity of 4 to 20%.

If the ceramics layer in which the cracks are introduced is used in a severe corrosive environment, there is a risk that a corrosive component may penetrate into the cracks from the surroundings. However, by the present construction in which the ceramics layer has the corrosive component penetration preventing layer of the same material as the ceramics layer formed thereon, penetration of the corrosive component can be effectively prevented and corrosion resistance of the thermal barrier coating is enhanced. If the thickness of the corrosive component penetration preventing layer is less than 5 μm, the effect of preventing the penetration of the corrosive component is not sufficient, and if this thickness exceeds 50 μm, while the penetration of the corrosive component can be sufficiently prevented, the Young's modulus of the layer becomes large and the anti-peeling ability tends to be deteriorated. Also, if the porosity is less than 4%, cracks are liable to be generated in the corrosive component penetration preventing layer, and if the porosity exceeds 20%, the effect of preventing the penetration of the corrosive component may not be sufficiently obtained.

In the thermal barrier coating of the present invention, it is preferable that a metallic bond layer is provided between the base material and the ceramics layer. According to this construction, stress caused by the difference in the linear thermal expansion coefficient between the base material that is usually a metal material and the ceramics layer can be mitigated by the metallic bond layer and a thermal barrier coating further excellent in the thermal cycle durability can be obtained. Also, this metallic bond layer ensures a stronger bonding between the base material and the ceramics layer and also contributes to enhancing the strength of the thermal barrier coating. As the ceramics layer is porous and insufficient in corrosion resistance, in order to prevent high temperature oxidation and high temperature corrosion of the base material, the metallic bond layer is preferably of a material excellent in oxidation resistance and corrosion resistance. Also, in order to efficiently mitigate the stress acting on the ceramics layer, the metallic bond layer is preferably of a material excellent in ductility.

The present invention also provides a manufacturing method of a thermal barrier coating comprising the steps of manufacturing a thermal spraying powder by mixing together a $Yb_2O_3$ powder and a $ZrO_2$ powder and forming a ceramics layer on a base material of a heat resistant alloy by a thermal spraying process using the thermal spraying powder.

In the above-mentioned manufacturing method of a thermal barrier coating, the thermal spraying powder may be further mixed with an $Er_2O_3$ powder, in addition to the $Yb_2O_3$ powder and $ZrO_2$ powder.

According to the present manufacturing method, a thermal barrier coating having a ceramics layer excellent in crystalline stability and anti-peeling ability can be easily manufactured with a high yield factor.

The manufacturing method of the thermal barrier coating of the present invention may further comprise the step of introducing cracks in the ceramics layer when the thermal spraying process is carried out using the thermal spraying powder. Forming of the ceramics layer by the thermal spraying process is carried out such that powder of a fusion or semi-fusion state is sprayed on the base material and is then rapidly cooled to be solidified on the surface of the base material. According to the manufacturing method of the present invention, a temperature change at the time of the solidification on the surface of the base material is made large and solidification cracks are intentionally generated in the ceramics layer that is being formed, and thus the cracks are introduced in the ceramics layer. The cracks so introduced by the method of the present invention cause no peeling of the ceramics layer. If the ceramics layer having no such cracks is first formed and then cracks are generated by adding stress to the ceramics layer so that the cracks are introduced therein, m phase will be generated by a stress-induced metamorphosis of the stabilized zirconia in the surroundings of the cracks to thereby cause volumetric changes in the thermal cycles, and this may expedite progress of the cracks to cause peeling of the ceramics layer. But there is little m phase in the surroundings of the cracks of the present invention and little volumetric change due to phase transition when thermal cycles arise. Hence, peeling of the ceramics layer hardly occurs.

The present invention further provides a turbine part comprising a thermal barrier coating as mentioned in any one of the above-mentioned inventions as well as a gas turbine comprising this turbine part. According to the turbine part so constructed, a turbine part excellent in heat resistance and thermal cycle durability can be obtained and a gas turbine further excellent in reliability can be constructed.

BRIEF DESCRIPTION OF THE DRAWINGS

FIG. 8 comprises FIGS. 8(a) and 8(b), wherein

DESCRIPTION OF THE PREFERRED EMBODIMENTS

Herebelow, embodiments according to the present invention will be described with reference to the appended drawings.

A. First Embodiment (Layers of the Thermal Barrier Coating)

Figure 1:
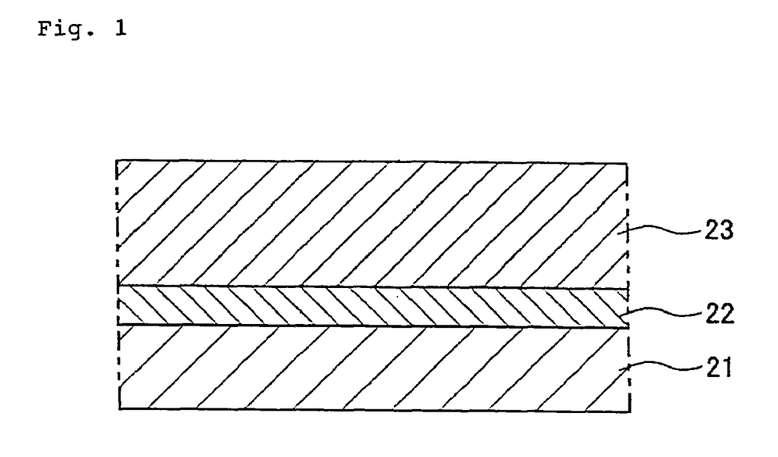
FIG. 1 is a schematic cross sectional view showing a structure of layers of a thermal barrier coating of a first embodiment according to the present invention.

FIG. 1 is a view schematically showing a cross sectional structure of layers of a first embodiment of a thermal barrier coating according to the present invention. This thermal barrier coating is constructed such that a bond coat layer 22 comprising an MCrAlY alloy, etc. as a metallic bond layer excellent in corrosion resistance and oxidation resistance is laminated on a base material 21 of a high temperature heat resistant alloy for a moving blade, etc. and, further thereon, a ceramics layer 23 comprising $ZrO_2$ partially stabilized by $Yb_2O_3$ (hereinafter referred to as "YbSZ") as a top coat is laminated. Here, "M" of the MCrAlY alloy constructing the bond coat layer 22 means a metal element, for example, a single metal element of Ni, Co, Fe, etc. or a combination of two or more kinds of these metal elements.

The bond coat layer 22 has a function to lessen the difference in the thermal expansion coefficient between the base material 21 and the ceramics layer 23 to thereby mitigate thermal stress, so that the ceramics layer 23 is prevented from peeling off from the bond coat layer 22. The bond coat layer 22 can be formed by a low pressure plasma spraying process, electron-beam physical vapor deposition process, etc. The bond coat layer 22 can also function as a protective layer for preventing high temperature oxidation or high temperature corrosion of the base material 21.

In the above-mentioned ceramics layer 23 constructed by YbSZ, when the addition quantity of $Yb_2O_3$ as the stabilizer becomes 2 weight % or more, a thermal cycle durability, to be described later, begins to be enhanced and this effect continues until immediately before the addition quantity becomes 35 weight %. The effective addition quantity of $Yb_2O_3$ as seen from the thermal cycle durability is considered 4 weight % or more and 30 weight % or less. If the addition quantity of $Yb_2O_3$ is in the range of 8 weight % or more and 27 weight % or less, the thermal barrier coating of the present embodiment can exhibit a more excellent thermal cycle durability. If the $Yb_2O_3$ addition exceeds the above-mentioned quantity, the thermal cycle durability lowers. This is for the reason that, if the mentioned addition quantity is less than 8 weight %, a residual quantity of monoclinic crystal phase (m phase) in the ceramics layer 23 increases to thereby deteriorate the durability and, if the addition quantity is more than 25 weight %, the ceramics layer 23 is liable to become a tetragonal crystal so that the rate of t' phase excellent in the durability lowers to thereby deteriorate the durability.

More preferably, the addition quantity of $Yb_2O_3$ is 10 weight % or more and 25 weight % or less and, most preferably, it is 12 weight % or more and 20 weight % or less. By controlling the addition quantity in these ranges, a thermal barrier coating further excellent in thermal cycle durability can be realized.

Also, it is preferable that a porosity of the ceramics layer 23 (a volumetric occupancy rate of pores formed in the ceramics layer 23 relative to the ceramics layer 23) is 8% or more and 15% or less. If the porosity is less than 8%, which is dense enough, the Young's modulus becomes higher and, if the thermal stress becomes higher, the layer is liable to peel off. Also, if the porosity is more than 15%, the bonding ability with the bond coat becomes lower to thereby lower the durability. A preferable thickness of the ceramics layer 23 is in the range of 0.1 to 1.5 mm. If it is less than 0.1 mm, the thermal barrier performance tends to become insufficient and, if it is more than 1.5 mm, the layer is liable to peel off to thereby lower the durability.

According to the thermal barrier coating of the present embodiment constructed as mentioned above, the ceramics layer is constructed by $ZrO_2$ stabilized by $Yb_2O_3$ and thereby the crystalline stability of the ceramics layer 23 is enhanced, the crystal phase of the ceramics layer 23 hardly changes during the thermal cycles even if it is used for a high temperature part of a turbine, etc. and the occurrence of cracks and the progress thereof due to phase metamorphosis can be prevented. Thus, a thermal barrier coating that is excellent in anti-peeling ability and thermal cycle durability and suitable for use in the high temperature parts can be realized.

In the present embodiment, while the case where $ZrO_2$ stabilized by $Yb_2O_3$ is used as a constructing material of the ceramics layer 23 has been described, $ZrO_2$ in which $Yb_2O_3$ and $Er_2O_3$, in place of the mentioned YbSZ, as the stabilizer are used can also be applied as the constructing material of the ceramics layer to be used for the thermal barrier coating of the present invention. In this case also, the same effect as the thermal barrier coating having the ceramics layer comprising the mentioned YbSZ can be obtained and a thermal barrier coating excellent in the thermal cycle durability can be realized.

(Manufacturing Method of the Thermal Barrier Coating)

Figure 2:
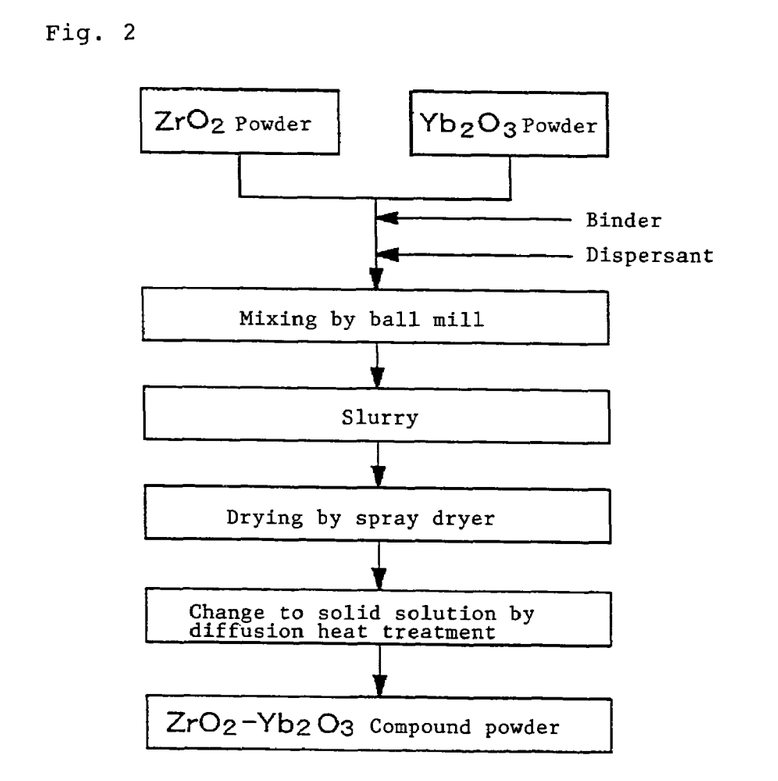
FIG. 2 is an explanatory view showing steps of a manufacturing process of thermal spraying powders used for manufacturing a ceramics layer of the thermal barrier coating of the present invention.

A manufacturing method of the thermal barrier coating shown in FIG. 1 will be described below with reference to FIG. 2. FIG. 2 is an explanatory view showing steps of the manufacturing process of thermal spraying powders used for manufacturing the ceramics layer of the thermal barrier coating of the present invention.

The ceramics layer 23 shown in FIG. 1 can be laminated by an atmospheric pressure plasma thermal spraying process or electron-beam physical vapor deposition process using $ZrO_2$—$Yb_2O_3$ compound powder. The $ZrO_2$—$Yb_2O_3$ compound powder used for the atmospheric pressure plasma thermal spraying can be manufactured by the following steps.

Firstly, as shown in FIG. 2, $ZrO_2$ powder and $Yb_2O_3$ powder to be added in a predetermined ratio are prepared and mixed together in a ball mill with the addition of an appropriate binder and/or dispersant to become slurry. Next, this slurry is dried by a spray dryer to be granulated and is then changed to a solid solution by heating to 1200 to 1600° C. by a diffusion heat treatment. Thus, a compound powder of $ZrO_2$—$Yb_2O_3$ in which $Yb_2O_3$ is uniformly diffused is obtained.

This compound powder is sprayed on the bond coat layer 22 by thermal spraying and a ceramics layer comprising YbSZ can be obtained. If the electron-beam physical vapor deposition process is used for forming the ceramics layer 23, an ingot obtained by sintering or fused solidification of a material having a predetermined composition is used.

If $ZrO_2$ stabilized by $Yb_2O_3$ and $Er_2O_3$ is used as the constructing material of the ceramics layer 23, $ZrO_2$ powder and $Yb_2O_3$ fine powder and $Er_2O_3$ fine powder to be added in a predetermined addition ratio are prepared and a compound powder of $ZrO_2$—($Yb_2O_3$+$Er_2O_3$) is made by the same method as mentioned above. This compound powder is treated by the thermal spraying or electron-beam physical vapor deposition and a ceramics layer comprising $ZrO_2$ stabilized by $Yb_2O_3$ and $Er_2O_3$ can be formed on the bond coat layer.

According to the manufacturing method of the present invention, the addition ratio of $Yb_2O_3$ or $Yb_2O_3$+$Er_2O_3$ to be included in the constructing material of the ceramics layer 23 can be easily controlled by changing the mixing ratio of the powders when the $ZrO_2$—$Yb_2O_3$ compound powder or $ZrO_2$—($Yb_2O_3$+$Er_2O_3$) compound powder is manufactured. Hence, the ceramics layer comprising $Yb_2O_3$ or $Yb_2O_3$+$Er_2O_3$ of an appropriate ratio can be easily formed and a thermal barrier coating having a desired anti-peeling ability can be easily formed.

Also, according to the manufacturing method of the present invention, the porosity of the ceramics layer 23 (volumetric rate of fine pores formed in the ceramics layer 23 relative to the ceramics layer 23) can be easily controlled by adjusting the electric current or the thermal spraying distance and a ceramics layer having an appropriate porosity can be easily formed. Thereby, a thermal barrier coating further excellent in the anti-peeling ability can be formed.

B. Second Embodiment

Figure 3:
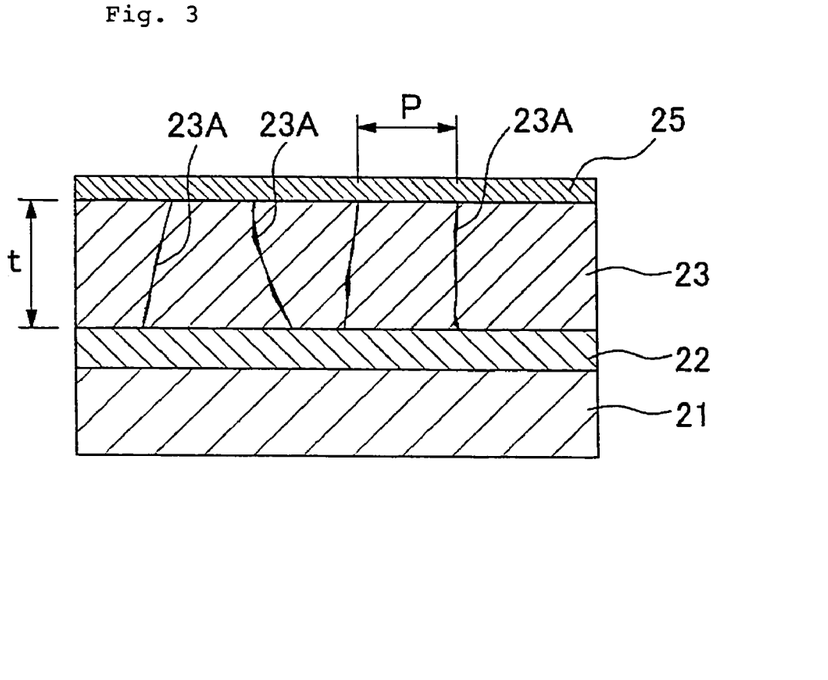
FIG. 3 is a schematic cross sectional view showing a structure of layers of a thermal barrier coating of a second embodiment according to the present invention.

A second embodiment according to the present invention will be described with reference to FIG. 3. FIG. 3 is a view schematically showing a cross sectional structure of layers of a thermal barrier coating of the second embodiment according to the present invention. The same parts or components in FIG. 3 as those shown in FIG. 1 are designated by the same reference numerals and description thereon will be omitted. The thermal barrier coating of the second embodiment is likewise constructed such that the bond coat layer 22 is formed on the base material 21 of a heat resistant alloy and the ceramics layer 23 is laminated on this bond coat layer 22.

The difference of the thermal barrier coating of the present embodiment from the thermal barrier coating shown in FIG. 1 is that the ceramics layer 23 has a plurality of cracks 23A formed therein so as to elongate in the coating thickness direction, as shown in FIG. 3. These cracks 23A are intentionally introduced at the time of forming the ceramics layer 23 in order to enhance the anti-peeling ability of the ceramics layer 23. As the ceramics layer 23 has a smaller thermal expansion coefficient as compared with the base material 21 made of a heat resistant alloy or the bond coat layer 22, when it is charged with thermal cycles due to start and stop of the turbine, stress acts on the ceramics layer 23 by the difference in the thermal expansion coefficient relative to the base material 21 or the bond coat layer 22. But, in the thermal barrier coating of the present invention, the stress acting on the ceramics layer 23 is mitigated by expansion or contraction of the gaps of the cracks 23A. Thus, the stress caused by the expansion and contraction due to thermal cycles acts less on the ceramics layer 23 itself and a thermal barrier coating having minimal peeling and excellent in the thermal cycle durability can be realized.

In the thermal barrier coating of the conventional construction, cracks caused in the ceramics layer are the reason causing the peeling of the ceramics layer. But the cracks 23A introduced in the ceramics layer 23 by the present invention are by no means a reason for causing peeling of the ceramics layer. This is because the surrounding crystal structure is different between the cracks 23A and the cracks caused by thermal cycles in the ceramics layer. That is, the cracks due to thermal cycles are caused by volumetric changes when the crystal phase changes such that, in a high temperature environment, the crystal phase of $ZrO_2$ constructing the ceramics layer changes to t phase (tetragonal crystal phase) from t' phase (semi-stabilized tetragonal crystal phase) and, when the temperature of the thermal barrier coating lowers, the t phase as a high temperature phase changes to m phase (monoclinic crystal phase) as a low temperature phase. Hence, in the surroundings of the cracks that are conventionally formed, the m phase is observed. On the contrary, in the cracks 23A introduced in the ceramics layer 23 by the present invention, little m phase is observed in the surroundings of the cracks 23A. In the prior art thermal barrier coating having the cracks in which the m phase is generated in the surroundings of the cracks, phase transitions are repeated between the m phase and t phase by the thermal cycles. Thereby, the cracks gradually progress to finally cause peeling of the ceramics layer. But according to the construction of the present invention, there arises little m phase in the surroundings of the cracks 23A and no such progress of the cracks is caused.

It is preferable that the above-mentioned cracks 23A are introduced in the ceramics layer 23 so as to elongate in the direction normal to a face of the ceramics layer 23 (the vertical direction in the figure). But if they elongate within an angle range of ±40' relative to the normal line, a sufficient effect to prevent the ceramics layer 23 from peeling can be obtained. Also, insofar as the cracks 23A elongate within this angle range, they will by no means become a reason for the peeling of the ceramics layer 23. A preferable range in which the cracks 23A are to elongate is ±20° relative to the normal line to the coating surface of the ceramics layer 23.

Also, it is preferable that an interval P between each of the cracks 23A shown in FIG. 3 is in the range of 0.05 to 1 times the coating thickness t of the ceramics layer 23. If the interval P is less than 0.05 times of the coating thickness t, the bonding force with the bond coat layer 22 as a substrate becomes insufficient so that peeling of the ceramics layer 23 is easily caused. Also, if the interval P is more than 1 times, a singular stress in the peeling direction at the crack extreme end increases and this will invite peeling.

According to the thermal barrier coating of the present embodiment constructed as described above, the cracks 23A are introduced in the ceramics layer 23 and thereby the stress caused by expansion and contraction of the thermal barrier coating due to thermal cycles is mitigated and a more excellent anti-peeling ability can be obtained.

In the present embodiment, while the case where $ZrO_2$ stabilized by $Yb_2O_3$ is used as the constructing material of the ceramics layer 23 has been described, like the thermal barrier coating of the first embodiment, it is a matter of course that $ZrO_2$ in which $Yb_2O_3$ and $Er_2O_3$, in place of YbSZ, as a stabilizer is used can also be applied as the constructing material of the ceramics layer to be used for the thermal barrier coating of the present invention. In this case also, the same effect as the thermal barrier coating having the ceramics layer 23 in which the cracks 23A are introduced can be obtained and a thermal barrier coating excellent in thermal cycle durability can be realized.

In the thermal barrier coating of the present embodiment having the cracks 23A, there is provided on the ceramics layer 23 a corrosive component penetration preventing layer 25 of the same material as the ceramics layer 23. In the case where the cracks 23A are introduced, while the peeling of the coating due to expansion and contraction can be effectively avoided, a corrosive component penetrates through the cracks 23A in an especially severe corrosive environment so that the bond coat layer 22 or the base material 21 may be corroded. But, by providing the corrosive component penetration preventing layer 25, penetration of the corrosive component can be effectively prevented and the corrosion resistance of the thermal barrier coating can be enhanced.

It is preferable that a thickness of the corrosive component penetration preventing layer is in the range of 5 to 50 μm and also a porosity thereof is preferably in the range of 4 to 20%. This is for the reason that, if the layer thickness is less than 5 μm, the effect of preventing the penetration of the corrosive component cannot be sufficiently obtained and, if the layer thickness is more than 50 μm, the Young's modulus of the layer becomes larger and the anti-peeling ability tends to lower. Also, if the porosity is smaller than 4%, cracks are liable to occur in the corrosive component penetration preventing layer 25 and, if the porosity exceeds 20%, the effect of preventing the penetration of the corrosive component cannot be sufficiently obtained.

(Manufacturing Method of the Thermal Barrier Coating)

A manufacturing method of the thermal barrier coating of the present embodiment will be described. In the manufacturing method of the present embodiment, the manufacturing process of the $ZrO_2$—$Yb_2O_3$ compound powder or $ZrO_2$—($Yb_2O_3+Er_2O_3$) compound powder is the same as the manufacturing method of the above-mentioned first embodiment and description thereof will be omitted.

The feature of the manufacturing method of the thermal barrier coating of the present embodiment is that the ceramics layer 23 having the cracks 23A can be easily formed. That is, the cracks 23A can be formed together when the ceramics layer 23 is formed by the thermal spraying process or electron-beam physical vapor deposition process. Concretely, for example, if the ceramics layer 23 having the cracks 23A is formed by the thermal spraying process, the thermal spraying distance (the distance between a spraying gun and the base material) is shortened approximately to ¼ to ⅔ of the thermal spraying distance conventionally employed for forming the ceramics layer, or the thermal spraying distance is maintained approximately the same distance as conventionally employed and the power supplied to the spraying gun is increased approximately 2 to 25 times the power conventionally employed, and thereby the cracks 23A can be introduced in the ceramics layer 23. That is, the cracks 23A are introduced such that the temperature of particles of a fusion state or semi-fusion state that fly to the base material 21 (or the bond coat layer 22) by the thermal spraying is elevated so that the temperature gradient when the ceramics layer 23 is rapidly cooled to be solidified is made larger and, by contraction at the solidification time, the cracks 23A are introduced. According to this method, by adjusting the thermal spraying distance and/or the power supplied to the spraying gun, the gaps or frequency (area density) of the cracks 23A can be easily controlled and the ceramics layer 23 having a desired characteristic can be formed. Thereby, a thermal barrier coating having an excellent anti-peeling ability and thermal cycle durability can be easily formed.

(Turbine Part and Gas Turbine)

The thermal barrier coating of the present invention constructed as mentioned above can be usefully applied to a moving blade or stationary blade of an industrial gas turbine or to an inner tube or tail tube (or transition tube) of a combustor thereof. Also, as it is not necessarily limited to the industrial gas turbine, it can be used as a thermal barrier coating of a high temperature engine part of an automobile or jet airplane. By applying the thermal barrier coating of the present invention to these parts, a gas turbine part or high temperature part excellent in thermal cycle durability can be constructed.

Figure 4:
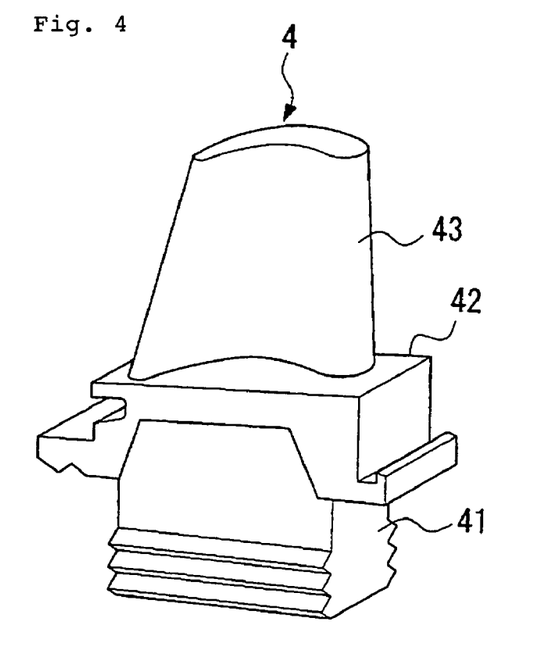
FIG. 4 is a perspective view showing a moving blade as one example of turbine parts according to the present invention.
Figure 5:
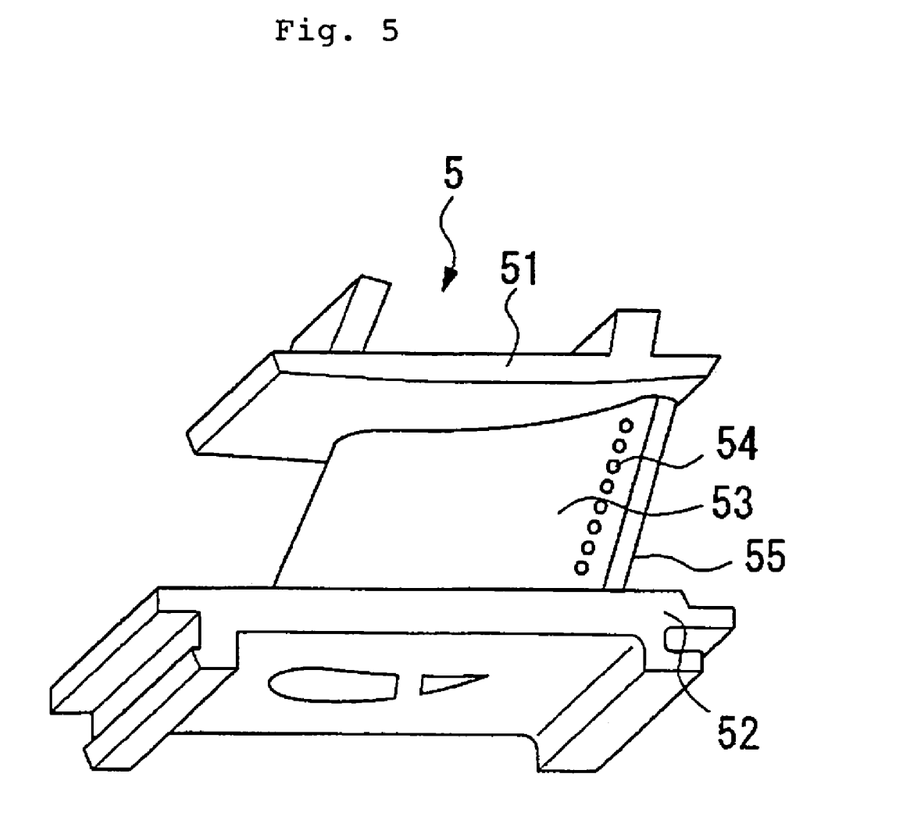
FIG. 5 is a perspective view showing a stationary blade as one example of turbine parts according to the present invention.

Both of FIGS. 4 and 5 are perspective views showing construction examples of turbine blades (turbine parts) to which the thermal barrier coating of the above-mentioned embodiments can be applied. A gas turbine moving blade 4 shown in FIG. 4 is constructed comprising a tab tail 41 to be fixed to a disc side, a platform 42, a blade portion 43, etc. Also, a gas turbine stationary blade 5 shown in FIG. 5 is constructed comprising an inner shroud 51, an outer shroud 52, a blade portion 53, etc., wherein the blade portion 53 has seal fin cooling holes 54, slits 55, etc. formed therein.

Figure 6:
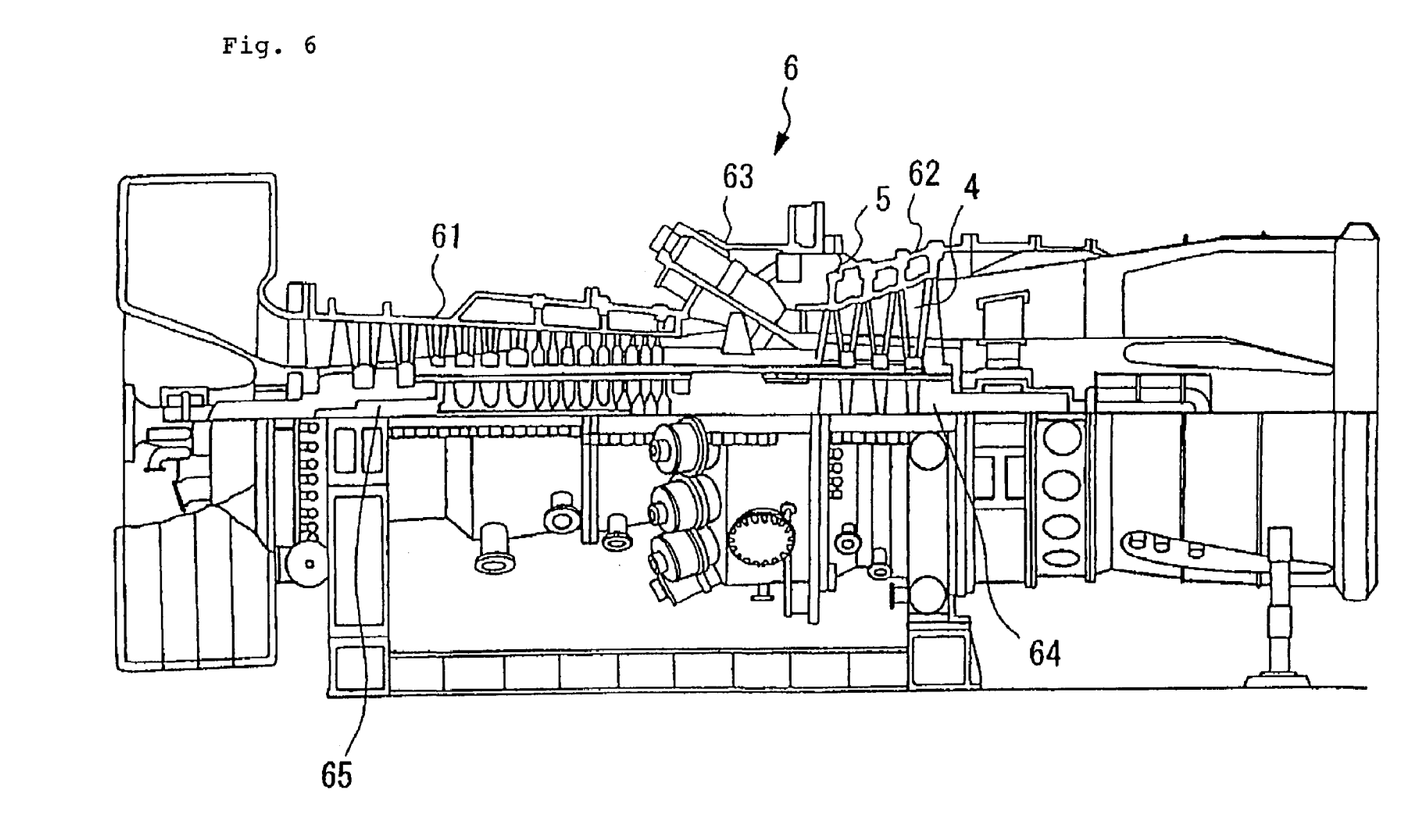
FIG. 6 is a partially cross sectional side view showing one example of a gas turbine having the turbine parts of FIGS. 4 and 5.

Next, a gas turbine to which the turbine blades 4, 5 shown in FIGS. 4 and 5 can be applied will be described with reference to FIG. 6. FIG. 6 is a partially cut out side view schematically showing a construction of a gas turbine 6 according to the present invention.

This gas turbine 6 comprises a compressor 61 and a turbine 62 directly connected to each other. The compressor 61 is constructed as an axial flow compressor, for example, to take in air or a predetermined gas as working fluid from an intake port for elevation of pressure thereof. A combustor 63 is connected to a discharge port of the compressor 61 and the compressed working fluid discharged from the compressor 61 is heated to a predetermined turbine inlet temperature at the combustor 63. The working fluid heated to the predetermined temperature is supplied into the turbine 62. As shown in FIG. 6, the gas turbine stationary blade 5 is provided to form several stages of blades (four stages in FIG. 6) within a casing of the turbine 62. Also, the gas turbine moving blade 4 is fitted to a main shaft 64, wherein a row of the moving blades and a row of the stationary blades form a pair of blades in each of the stages. The main shaft 64 has its one end connected to a rotational shaft 65 of the compressor 61 and the other end connected to a rotational shaft of a generator (not shown).

By the construction mentioned above, the high temperature high pressure working fluid is supplied into the casing of the turbine 62 from the combustor 63 to expand in the casing, thereby rotating the main shaft 64 and driving the generator connected to the gas turbine 6. That is, by the pressure drop at the stationary blade 5 fixed to the casing, kinetic energy is generated, and this kinetic energy is converted into a rotational torque via the moving blade 4 fitted to the main shaft 64. The rotational torque so generated is conveyed to the main shaft 64 to drive the generator.

Generally, a material used for a gas turbine moving blade is a heat resistant alloy (for example, CM247L marketed by Cannon Maskegon Company) and a material used for a gas turbine stationary blade is likewise a heat resistant alloy (for example, IN938 marketed by INCO Company). That is, as the material constructing the turbine blades, a heat resistant alloy that can be employed as a base material of the thermal barrier coating of the present invention is used. Hence, if the thermal barrier coating of the present invention is applied to these turbine blades, a turbine blade excellent in heat barrier effect and anti-peeling ability can be obtained. That is, by applying the thermal barrier coating of the present invention, a turbine blade that can be used in a higher temperature environment and still have an excellent durability and long life can be realized. This applicability to the higher temperature environment means that the temperature of the working fluid can be elevated and thereby enhancement of the gas turbine efficiency also becomes possible.

ACTUAL EXAMPLES

Herebelow, actual examples will be explained in order to describe the present invention more in detail as well as to make the effect of the present invention clearer.

Example 1

In the present example, in order to verify a change in the thermal cycle life corresponding to the addition quantity of $Yb_2O_3$, samples having a YbSZ layer in which a $Yb_2O_3$ addition quantity in $ZrO_2$ is variously changed are formed and the thermal cycle life is measured. A base material used for forming the samples is a Ni base heat resistant alloy and the alloy composition is Ni—16Cr—8.5Co—1.7Mo—2.6W—1.7T—0.9Nb—3.4Al—3.4Ti. This base material has its surface applied with a grid blast treatment using $Al_2O_3$ grains and, thereon, a bond coat layer made of a CoNiCrAlY alloy having a composition of Co—32Ni—21Cr—8Al—0.5Y as a metal bond layer is formed by a low pressure plasma thermal spraying. A ceramics layer (YbSZ layer) is laminated on this bond coat layer of CoNiCrAlY by an atmospheric pressure plasma thermal spraying so that a thermal barrier coating is formed. A diffusion heat treatment temperature for making the $ZrO_2$—$Yb_2O_3$ compound powder used for the thermal spraying of the YbSZ layer is 1450° C.

The $Yb_2O_3$ addition quantity in the ceramics layer of each of the samples is shown in Table 1 (Sample Nos. 1 to 13).

It is to be noted that a thickness of the bond coat layer (CoNiCrAlY) is 0.1 mm and a thickness of the ceramics layer (YbSZ) is 0.5 mm commonly in each of the samples.

Next, a sample using YSZ in the ceramics layer is manufactured as a comparison sample. The addition quantity of $Y_2O_3$ in this ceramics layer comprising the YSZ is 8 weight % and the porosity is 10% (Sample No. 14).

It is to be noted that the Sample No. 14 in which the ceramics layer comprising YSZ is formed is the same as the thermal barrier coating conventionally used for gas turbine moving blades, stationary blades, etc.

Figure 7:
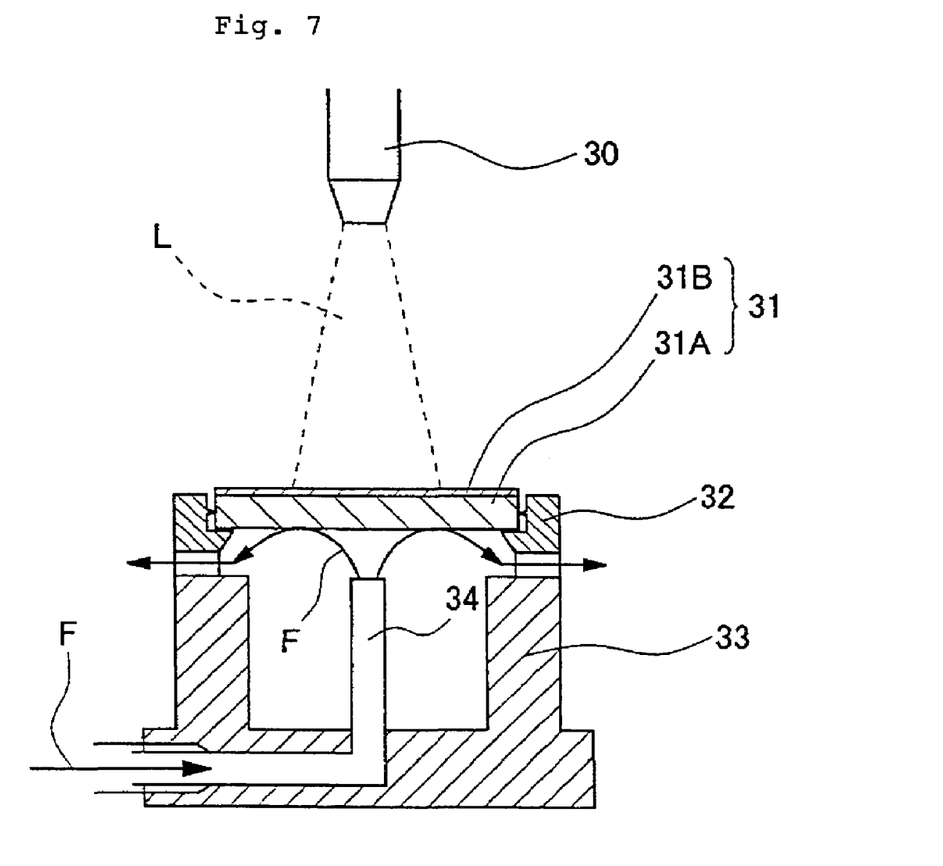
FIG. 7 is a schematic cross sectional view of a laser type thermal cycle test device used for testing the embodiments according to the present invention.

With respect to each of the samples so obtained, an evaluation of the thermal cycle durability is carried out. FIG. 7 is a schematic cross sectional view of a laser type thermal cycle test device used for the evaluation of the thermal cycle durability in the present actual examples. In the laser type thermal cycle test device shown here, a sample holder 32 is provided on a main body 33 and a sample 31 in which a thermal barrier coating 31B is formed on a base material 31A is arranged on the sample holder 32 so that the thermal barrier coating 31B faces the outer side, or the upper side in the figure. Laser beam L is irradiated to this sample 31 from a $CO_2$ laser device 30 so that the sample 31 is heated from the thermal barrier coating 31B side. At the same time as the heating by the laser device 30, gas flow F is discharged from an end of a cooling gas nozzle 34, arranged projecting through the interior of the main body 33 at a position opposite to the inner side or back side of the sample 31, so that the sample 31 is cooled from its inner side or back side.

Figure 8:
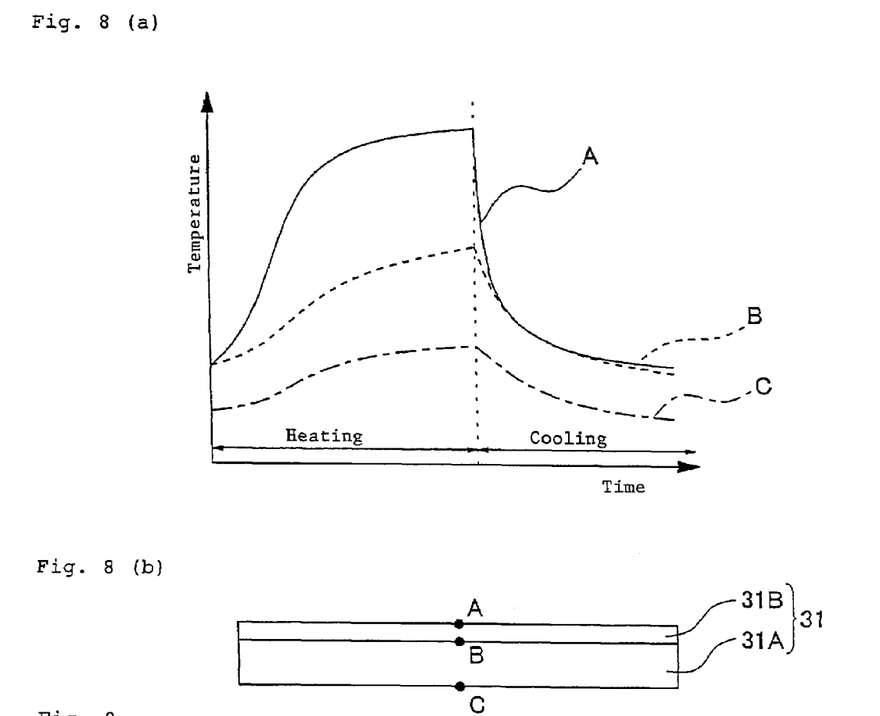
FIG. 8(a) is a graph showing a temperature hysteresis of samples at the time of thermal cycle tests using the thermal cycle test device of FIG. 7
FIG. 8(b) is an explanatory view showing measuring points corresponding to the respective curves of FIG. 8(a).

According to the laser type thermal cycle test device constructed as mentioned above, a temperature gradient can be easily formed in the sample 31 and an evaluation corresponding to the environment of use as an application to a high temperature part of gas turbine parts and components can be carried out. FIG. 8(a) is a graph schematically showing a temperature change of the samples used for thermal cycle tests using the device shown in FIG. 7. Curves A to C shown here correspond to temperature measuring points A to C of the sample 31 shown in FIG. 8(b), respectively. As shown in FIGS. 8(a) and (b), according to the device of FIG. 7, the sample 31 can be heated such that the temperature becomes lower in the order of surface A of the thermal barrier coating 31B, interface B between the thermal barrier coating 31B and the base material 31A and back side C of the base material 31A. Therefore, the sample 31 is heated, for example, such that the surface of the thermal barrier coating 31B is of a high temperature of 1200° C. or more and the interface between the thermal barrier coating 31B and the base material 31A is of a temperature of 800 to 900° C., and thereby the same or similar temperature condition as an actual gas turbine can be realized. It is to be noted that the temperature of heating and the temperature gradient realized by the present test device can be easily set to a desired temperature condition by adjusting the power of the laser device 30 and the gas flow F.

In the present example using the thermal cycle test device shown in FIG. 7, the maximum surface temperature (the maximum temperature of the surface of the thermal barrier coating) is set to 1300° C., the maximum interface temperature (the maximum temperature of the interface between the thermal barrier coating and the base material) is set to 950° C. and the heating is repeatedly carried out, wherein heating of 3 minutes and cooling of 3 minutes are repeated (the surface temperature at the cooling time is set to 100° C. or less). The number of cycles at the time when peeling of the thermal barrier coating begins in the present thermal cycle tests is shown together in Table 1 as the thermal cycle life.

As shown in Table 1, it is confirmed that the Sample Nos. 5 to 12 in which the $Yb_2O_3$ addition quantity is 8 to 27 weight % are excellent in thermal cycle durability as compared with Sample No. 14 using the YSZ ceramics layer of the conventional construction. Also, Sample Nos. 6 to 11 in which the $Yb_2O_3$ addition quantity is 10 to 25 weight % have a thermal cycle life of 900 cycles or more and are especially excellent in thermal cycle durability. Moreover, Sample Nos. 7 to 10 in which the $Yb_2O_3$ addition quantity is 15 to 20 weight % have a thermal cycle life of 2000 cycles or more and are most excellent in thermal cycle life.

TABLE 1

| Sample Nos. | $Yb_2O_3$ Addition Quantity (wt %) | Porosity after Thermal Spraying | Thermal Cycle Life (cycles) |
| --- | --- | --- | --- |
| 1 | 0 | 10% | 1 |
| 2 | 2 | 10% | 3 |
| 3 | 4 | 10% | 10 |
| 4 | 6 | 10% | 50 |
| 5 | 8 | 10% | 250 |
| 6 | 10 | 10% | 526 |
| 7 | 15 | 10% | 3684 |
| 8 | 16 | 10% | 4528 |
| 9 | 20 | 10% | 3249 |
| 10 | 25 | 10% | 1245 |
| 11 | 27 | 10% | 220 |
| 12 | 30 | 10% | 50 |
| 13 | 35 | 10% | 1 |
| 14 | 8($Y_2O_3$) | 10% | 200 |

Example 2

Next, in order to verify an effect to introduce the cracks 23A in the ceramics layer 23 by changing the thermal spraying distance, samples of the thermal barrier coating comprising the ceramics layer 23 are prepared such that the ceramics layer 23 has the cracks 23A formed therein with intervals P between the cracks as shown in Table 2. The ceramics layer of the samples used in the present example is formed by the same process as used in the Example 1 except that the samples are made by using $ZrO_2$ added with $Yb_2O_3$ of the addition quantity shown in Table 2 and the thermal spraying distance is changed. Also, as a result of measuring the porosity of the ceramics layer of the samples prepared, the porosity including the cracks is about 8%.

As shown in Table 2, the samples of the present example in which the cracks 23A are introduced exhibit a high thermal cycle life even with the same $Yb_2O_3$ addition quantity as compared with the respective samples of the Example 1 in which none of the cracks 23A is introduced. Thus, it is confirmed that the thermal cycle durability can be remarkably enhanced by introducing the cracks 23A having the intervals within an appropriate range.

TABLE 2

| Sample Nos. | Yb$_2$O$_3$ Addition Quantity (wt %) | Thermal Spraying Distance (mm) | Range of Intervals P of Cracks (mm) | Thermal Cycle Life (cycles) |
|---|---|---|---|---|
| 15 | 0 | 70 | 0.025~0.5 | 32 |
| 16 | 2 | 70 | 0.025~0.5 | 54 |
| 17 | 4 | 70 | 0.025~0.5 | 88 |
| 18 | 6 | 70 | 0.025~0.5 | 305 |
| 19 | 8 | 70 | 0.025~0.5 | 1050 |
| 20 | 10 | 70 | 0.025~0.5 | 3084 |
| 21 | 12 | 70 | 0.025~0.5 | 5084 |
| 22 | 16 | 70 | 0.025~0.5 | 8821 |
| 23 | 20 | 70 | 0.025~0.5 | 7021 |
| 24 | 25 | 70 | 0.025~0.5 | 3240 |
| 25 | 27 | 70 | 0.025~0.5 | 1250 |
| 26 | 30 | 70 | 0.025~0.5 | 650 |
| 27 | 35 | 70 | 0.025~0.5 | 123 |

Yb$_2$O$_3$ addition quantity: 16 weight %
Thickness of the thermal barrier coating 0.5 mm, porosity 8%

Example 3

Next, in order to verify a change in durability due to porosity of YbSZ in the ceramics layer comprising YbSZ, samples of the thermal barrier coating comprising the ceramics layer are prepared such that the ceramics layer, having the porosity as shown in Table 3, is formed on a base material. The porosity of the ceramics layer of each of the samples is set to a predetermined level by adjusting the spraying electric current or thermal spraying distance out of the thermal spraying conditions. Except that the porosity is so adjusted and the Yb$_2$O$_3$ addition quantity is set to 18 weight %, the samples are made in the same way as the above-mentioned Example 1.

From Table 3, it is confirmed that, in the samples of Nos. 31 to 33 in which the porosity of the ceramics layer is 8 to 15%, the thermal barrier coating exhibits a more excellent thermal cycle durability as compared with the thermal barrier coating having the conventional ceramics layer comprising YSZ shown in Table 1.

TABLE 3

| Sample Nos. | Yb$_2$O$_3$ Addition Quantity (wt %) | Porosity after Thermal Spraying | Thermal Cycle Life (cycles) |
|---|---|---|---|
| 28 | 16 | 2% | 234 |
| 29 | 16 | 4% | 1523 |
| 30 | 16 | 6% | 2001 |
| 31 | 16 | 8% | 3528 |
| 32 | 16 | 12% | 4528 |
| 33 | 16 | 15% | 3568 |
| 34 | 16 | 20% | 1650 |
| 35 | 16 | 25% | 502 |
| 36 | 16 | 30% | 35 |

Example 4

In the present Example 4, samples of the thermal barrier coating are prepared such that the kinds of stabilizer for the stabilized zirconia used in the ceramics layer of the thermal barrier coating are variously changed and the thermal cycle tests are carried out. In each of these samples, the same method as preparing the Sample No. 8 of the above-mentioned Example 1 (Yb$_2$O$_3$ addition quantity is 16 weight %) is employed, except that the kinds of stabilizer powder used for preparing the thermal spraying powder are changed.

As a stabilizer other than Yb$_2$O$_3$, components of Er$_2$O$_3$, Dy$_2$O$_3$, Gd$_2$O$_3$, Sm$_2$O$_3$, Nd$_2$O$_3$ and Y$_2$O$_3$ are used, wherein the addition quantity, except that of Y$_2$O$_3$, is a molar concentration (5.6 molar %) corresponding to Yb$_2$O$_3$ of 16 weight % and, only with respect to Y$_2$O$_3$, the addition quantity is 8 weight % (4.5 molar %) that is the most general addition quantity conventionally used as the stabilizer.

Also, as to the thermal cycle tests, the same thermal cycle test device as used in the above-mentioned Example 1 is used and measuring of each of the samples is carried out, wherein the maximum surface temperature at the heating time is set to 1420° C.

Figure 9:
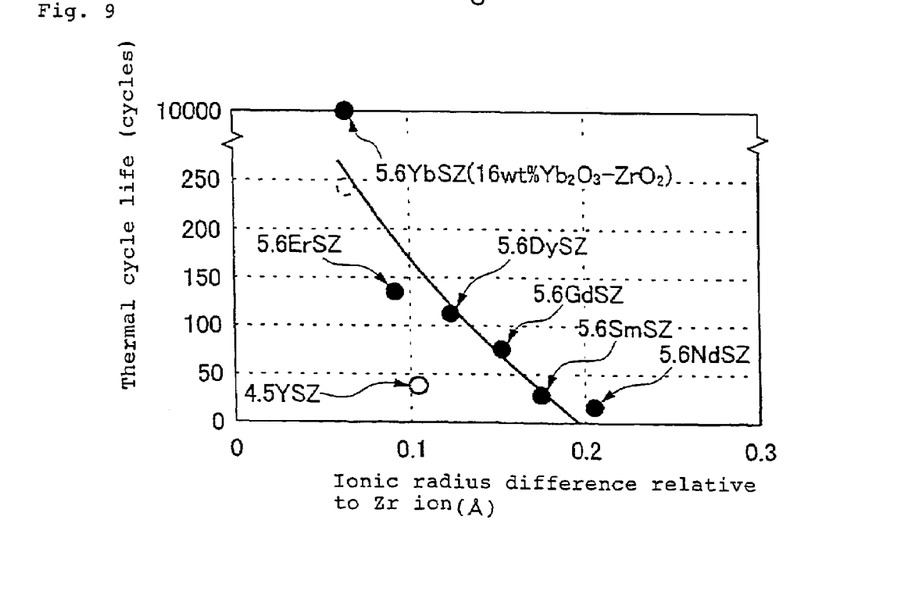
FIG. 9 is a graph showing a thermal cycle life relative to the kind of stabilizer used in the material of ceramics layer with respect to Example 4 of the present invention.

FIG. 9 is a graph showing the result of measurements in the thermal cycle tests of the samples with the maximum surface temperature of 1420° C. The vertical axis of FIG. 9 shows the thermal cycle life (cycles) in the thermal cycle tests having the maximum surface temperature set to 1420° C. and the horizontal axis shows the ionic radius difference between the ionic radius of each of the main elements used as the stabilizer and the ionic radius of Zr ion. In FIG. 9, 5.6YbSZ shows the thermal barrier coating comprising the ceramics layer using ZrO$_2$ that is added with Yb$_2$O$_3$ of 5.6 molar % (16 weight %) as the stabilizer. Likewise, 5.6ErSZ, 5.6DySZ, 5.6GdSZ, 5.6SmSZ, 5.6NdSZ and 4.5YSZ show the samples using the construction materials of the ceramics layer of ZrO$_2$ added with Er$_2$O$_3$ of 5.6 molar %, Dy$_2$O$_3$ of 5.6 molar %, Gd$_2$O$_3$ of 5.6 molar %, Sm$_2$O$_3$ of 5.6 molar %, Nd$_2$O$_3$ of 5.6 molar % and Y$_2$O$_3$ of 4.5 molar % (8 weight %), respectively.

As shown in FIG. 9, in the samples added with the stabilizers including heavy rare-earth elements of Er, Dy, Gd, Sm and Nd, such a tendency is seen that the smaller the ionic radius difference relative to the Zr ion, the longer the thermal cycle life. On the other hand, while YbSZ used as the construction material of the ceramics layer of the present invention, being nearest to Zr ion with respect to the ionic radius out of the stabilizers used in the present Example 4, has been expected to exhibit a more excellent thermal cycle durability, it actually exhibits a remarkably excellent thermal cycle durability of more than 10,000 cycles (the tests were stopped with 10,000 cycles), by far exceeding the tendency of the above-mentioned heavy rare-earth elements, as compared with the case added with the stabilizer including such heavy rare-earth elements.

Next, in order to verify a crystalline stability of the above samples, the samples prepared as mentioned above are heated by three conditions of 1200° C.×1000 hours, 1300° C.×1000 hours and 1400° C.×1000 hours, and the generation quantity of the monoclinic crystal phase (m phase) in the ceramics layer of the thermal barrier coating is measured with respect to each of the samples after being heated. The measurement of this m phase is carried out such that an X-ray diffraction pattern of the sample after being heated is measured and, based on the result of this measurement, the m phase is calculated by the following Equation 1, that appears on the publication "Surface and Coating Technology 82 (1996) 70-76 by R. L. Jones et al.".

$$\% \text{ monoclinic} = \% \text{ destabilyaim (destabilized rate)} \quad \text{Equation 1}$$
$$= 100 \times m(\underline{1}11)/\{m(\underline{1}11) + t'(111)\}$$

wherein m ($\underline{1}$11) is an area of the X-ray diffraction peak on the ($\underline{1}$11) face of the m phase and t' (111) is an area of the X-ray diffraction peak on the (111) face of the t' phase. It is to be noted that, in the present specification, relative to the crystallographic face index (111), the face on the opposite side of the origin is expressed by ($\bar{1}11$).

Figure 10:
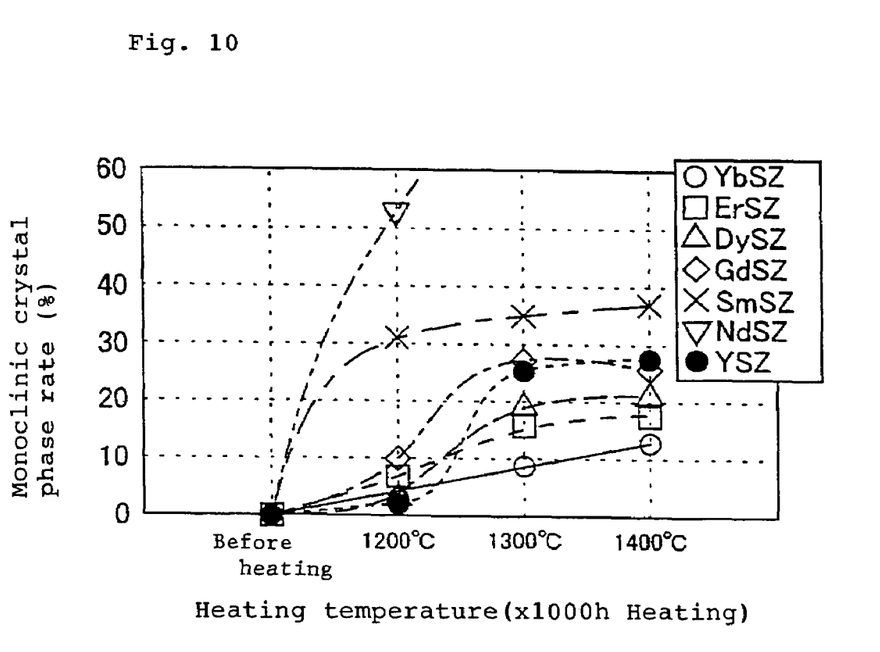
FIG. 10 is a graph showing a generation quantity of monoclinic crystal phase of the ceramics layer after being heated, relative to the kind of stabilizer used in the ceramics layer with respect to the Example 4 of the present invention.

The result of the measurements is shown in FIG. 10. The vertical axis of the graph of FIG. 10 shows a generation quantity of the monoclinic crystal phase and the horizontal axis shows a heating temperature.

As shown in FIG. 10, such a tendency is seen that the higher the heating temperature, the more the generation quantity of the monoclinic crystal phase in each of the samples. But, in the thermal barrier coating according to the present invention in which the ceramics layer comprises YbSZ, the generation quantity of the monoclinic crystal phase is least even in the case of heating to a higher temperature, and it is confirmed that the thermal barrier coating of the present invention has the most excellent crystalline stability. Also in FIG. 10, the sample comprising ErSZ exhibits an excellent crystalline stability next to YbSZ and it is suggested that an excellent crystalline stability can be obtained also by adding $Yb_2O_3$ and $Er_2O_3$ as the stabilizer.

EFFECT OF THE INVENTION

As described above, in the thermal barrier coating of the present invention, the ceramics layer as a top coat is constructed by $ZrO_2$ stabilized by $Yb_2O_3$, that is more excellent in the crystalline stability than the conventional YSZ, or is constructed by $ZrO_2$ stabilized by $Yb_2O_3$ and $Er_2O_3$ and thereby a thermal barrier coating in which a phase metamorphosis hardly occurs in the ceramics layer even if it is exposed to a high temperature for a long time can be constructed. Hence, even if the environment of use is of a higher temperature than the conventional temperature, a thermal barrier coating having a sufficient durability can be obtained.

Also, in the thermal barrier coating of the present invention, the cracks having intervals between them within appropriate ranges are introduced in the ceramics layer, and thereby a durability of the thermal barrier coating of the present invention having an excellent thermal cycle durability can be further enhanced.

Also, in the turbine part of the present invention, the ceramics layer as a top coat has its surface covered by the thermal barrier coating constructed by $ZrO_2$ stabilized by $Yb_2O_3$, that is more excellent in the crystalline stability than the conventional YSZ, or is constructed by $ZrO_2$ stabilized by $Yb_2O_3$ and $Er_2O_3$ and thereby a turbine part having a sufficient durability can be obtained even if the environment of use is of a higher temperature than the conventional temperature.

What is claimed is:

1. A thermal barrier coating arrangement comprising:
a base material of a heat resistant alloy; and
a ceramics layer formed on said base material for enhancing heat resistance of said base material;
wherein said ceramics layer comprises $ZrO_2$ provided with $Yb_2O_3$ of 15 weight % or more and 20 weight % or less as a stabilizer;
wherein said ceramics layer has cracks introduced into said ceramics layer that extend in a thickness direction of said ceramics layer;
wherein said cracks are introduced into said ceramics layer such that they extend in a range of ±40° relative to a normal line to a face of said ceramics layer and not outside the range; and
wherein said ceramics layer has fine pores formed therein and a porosity of said pores relative to said ceramics layer is 8% or more and 15% or less.

2. A thermal barrier coating arrangement as claimed in claim 1, wherein an interval between adjacent said cracks is 0.05 to 1 times the thickness of said ceramics layer.

3. A thermal barrier coating arrangement as claimed in claim 1, wherein said ceramics layer in which said cracks are introduced has a corrosive component penetration preventing layer that is made of the same material as said ceramics layer and is formed on said ceramics layer.

4. A thermal barrier coating arrangement as claimed in claim 3, wherein said corrosive component penetration preventing layer has a thickness of 5 to 50 μm and a porosity of 4 to 20%.

5. A thermal barrier coating arrangement as claimed in claim 1, wherein a metallic bond layer is provided between said base material and said ceramics layer.

6. A turbine part comprising a thermal barrier coating as claimed in claim 1.

7. A gas turbine comprising a turbine part as claimed in claim 6.

8. A thermal barrier coating arrangement comprising:
a base material of a heat resistant alloy; and
a ceramics layer formed on said base material for enhancing heat resistance of said base material;
wherein said ceramics layer comprises $ZrO_2$ provided with $Yb_2O_3$ of 16 weight % as a stabilizer;
wherein said ceramics layer has cracks introduced into said ceramics layer that extend in a thickness direction of said ceramics layer;
wherein said cracks are introduced into said ceramics layer such that they extend in a range of ±40° relative to a normal line to a face of said ceramics layer and not outside the range; and
wherein said ceramics layer has fine pores formed therein and a porosity of said pores relative to said ceramics layer is 8% or more and 15% or less.

9. A thermal barrier coating arrangement as claimed in claim 8, wherein an interval between adjacent said cracks is 0.05 to 1 times the thickness of said ceramics layer.

10. A thermal barrier coating arrangement as claimed in claim 8, wherein said ceramics layer in which said cracks are introduced has a corrosive component penetration preventing layer that is made of the same material as said ceramics layer and is formed on said ceramics layer.

11. A thermal barrier coating arrangement as claimed in claim 10, wherein said corrosive component penetration preventing layer has a thickness of 5 to 50 μm and a porosity of 4 to 20%.

12. A thermal barrier coating arrangement as claimed in claim 8, wherein a metallic bond layer is provided between said base material and said ceramics layer.

13. A turbine part comprising a thermal barrier coating as claimed in claim 8.

14. A gas turbine comprising a turbine part as claimed in claim 13.

* * * * *